(12) United States Patent
Faith et al.

(10) Patent No.: US 8,312,181 B1
(45) Date of Patent: Nov. 13, 2012

(54) INITIATION OF READ-AHEAD REQUESTS

(75) Inventors: Rickard Faith, Hillsborough, NC (US); Matti Vanninen, Cary, NC (US); Douglas Pase, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 99 days.

(21) Appl. No.: 12/636,595

(22) Filed: Dec. 11, 2009

(51) Int. Cl.
*G06F 13/28* (2006.01)
*G06F 13/00* (2006.01)
(52) U.S. Cl. .......................................... 710/22; 710/112
(58) Field of Classification Search ..................... 710/22, 710/112

See application file for complete search history.

(56) References Cited

U.S. PATENT DOCUMENTS

| | | | | |
|---|---|---|---|---|
| 6,023,720 A | * | 2/2000 | Aref et al. | 718/103 |
| 2007/0239936 A1 | * | 10/2007 | Gluhovsky | 711/118 |
| 2009/0070527 A1 | * | 3/2009 | Tetrick | 711/113 |
| 2009/0300248 A1 | * | 12/2009 | Beaman | 710/112 |
| 2010/0218006 A1 | * | 8/2010 | Boss et al. | 713/300 |

* cited by examiner

*Primary Examiner* — Hyun Nam
(74) *Attorney, Agent, or Firm* — Schwegman Lundberg & Woessner, P.A.

(57) ABSTRACT

Example embodiments provide various techniques for initiating read-ahead requests. A rate at which applications is requesting data from a data storage device is identified. Additionally, a length of time in retrieving or servicing the data from the data storage device is also identified. The identified rate and length of time in retrieving the data are used to determine when read-ahead requests should be sent to prefetch data.

19 Claims, 7 Drawing Sheets

| DATA STREAM A ||
| :---: | :---: |
| ARRIVAL TIMES 502<br>(hour:minute:second) | AVERAGE INTERARRIVAL TIMES 503 |
| 12:40:01 | N/A |
| 12:40:05 | 04 |
| 12:40:06 | 01 |
| 12:40:09 | 03 |
| ... | ... |
| ... | ... |
| ... | ... |

INITIATION OF READ-AHEAD REQUESTS

FIELD

The present disclosure relates generally to storage systems. In an embodiment, the disclosure relates to initiation of read-ahead requests.

BACKGROUND

In general, a storage system refers to a system of one or more processing systems and storage devices where data is stored on data storage devices such that the data can be made available to the processing systems. A computer with a hard disk drive is an example of a storage system. In another example, a storage system includes a network attached storage system.

In a storage system, applications executed by or embedded in a processing system normally send requests for data stored on the data storage devices. Servicing these reads can be slow because of the high latency of disk reads. If the reads can be predicted, the high latency of reading from disks can be compensated by issuing disk reads before the data is requested. In particular, when an application requests blocks of data that are sequential (or one after the other), speculative read-ahead can be applied on those sequential blocks where portions of these blocks are read from disk into a cache before the application requests these portions.

Most read-ahead implementations are overly aggressive, erring on the side of reading speculatively far faster than consumption by the applications. Such reading ahead too soon can cause other data in cache to be evicted before access by other applications. Without quick access to this data in the cache, functionalities provided by these other applications may be delayed. On the other hand, read-ahead implementations where reading data too late can cause the sequential workload to slow down.

SUMMARY

Example embodiments provide various techniques for initiating read-ahead request. Generally, a rate at which applications is requesting data from a data storage device is identified and recorded. Additionally, a length of time in retrieving or servicing the data from the data storage device is identified. Embodiments of the present invention use the identified rate and length of time in retrieving the data to determine when read-ahead requests should be sent to pre-fetch data. In one example, this determination can be made by computing a deadline before which data should be read from the data storage device such that the data is in the cache before the applications request this data.

As a load on a computer system changes, there can be significant variation in data retrieval time. By taking into account the rate at which data is being requested and the time in retrieving the data, embodiments of the present invention respond to those changes in real time by adjusting deadlines as data storage devices become more or less busy. In systems where cache sizes are limited, the dynamic issuance of read-ahead requests may, for example, prevent data retrieved from read-ahead request from being evicted from cache before it is requested by an application.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
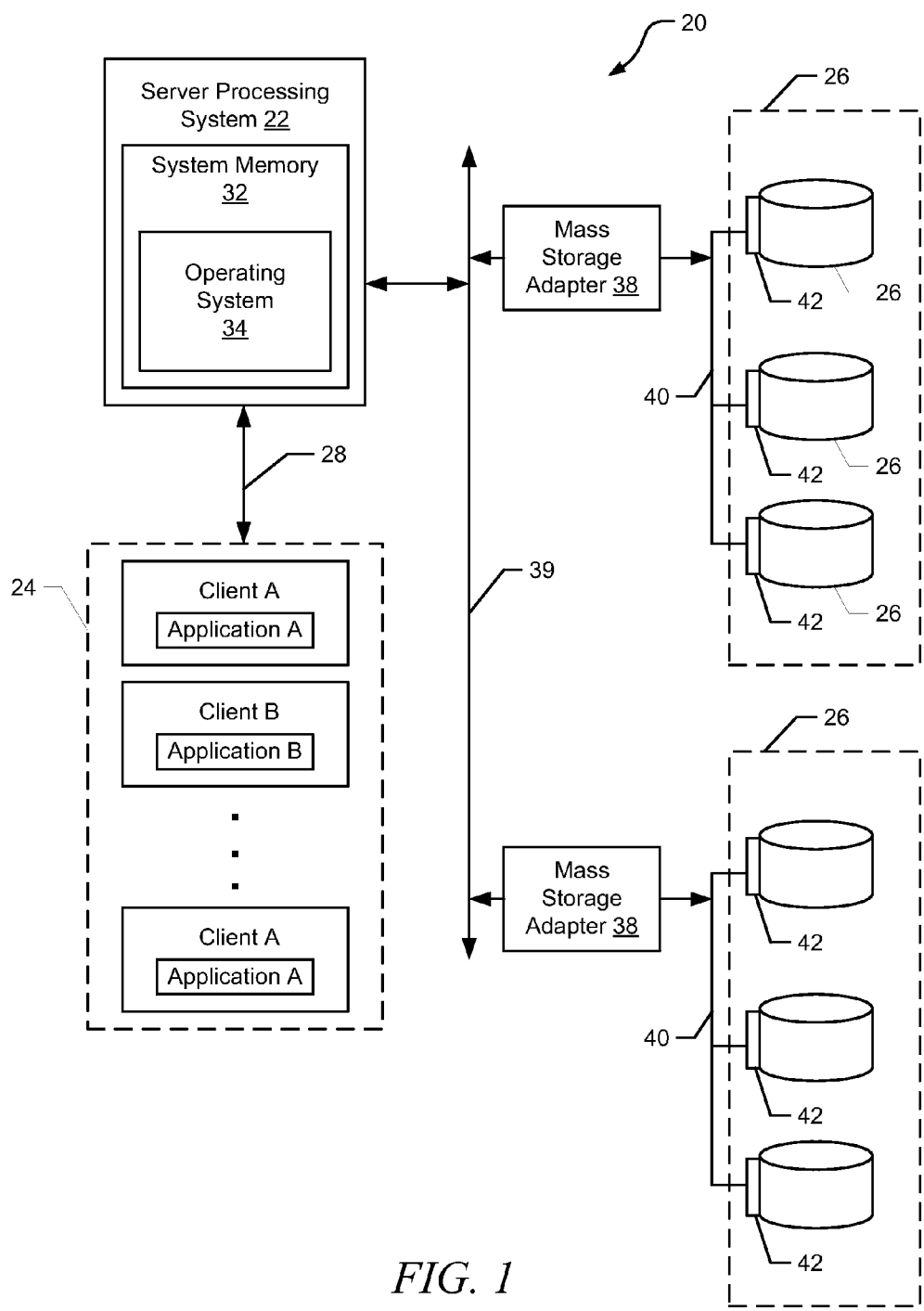
FIG. 1 depicts a block diagram of a network file storage computer system, consistent with one of many embodiments of the present invention.

FIG. 1 depicts a block diagram of a network file storage system 20, consistent with one of many embodiments of the present invention. The storage system 20 includes a server processing system 22 ("server") and multiple client processing systems 24 (each a "client"). The server 22 communicates data between data storage devices 26 and clients 24 in input/output (I/O) operations. Generally, the server 22 and the clients 24 function in a server-client mass data storage communication relationship with the data storage devices 26. The clients 24 execute or host one or more applications. In I/O operations, applications hosted on the clients 24 transmit read requests to, for example, the server 22. As used herein, a "read request" refers to an application's request for data. Examples of read requests may be included in Network File System (NFS) commands, Structured Query Language (SQL) commands, Hypertext Transfer Protocol (HTTP) commands, and other commands. The data communicated in the I/O operations is transferred between the server 22 and the clients 24 by a computer network communication link 28. It should be appreciated that a variety of computer network protocols are used to transfer data between the server 22 and the clients 24 over the communication link 28. These protocols include, for example, Fibre Channel Protocol (FCP), Ethernet, and Internet Small Computer System Interface Protocol (iSCSI).

The server 22 includes a system memory 32 that stores instructional code or firmware to supply the functionality of the server 22. As explained in more detail below, the server 22 executes an operating system 34 that causes one or more processors on the server 22 to perform the I/O operations between the server 22, the clients 24, and the data storage devices 26, and to perform data management functions on the data storage devices 26, among other operations. In addition to storing the operating system 34, the system memory 32 also stores the instructional code or firmware that a processor uses to execute the conventional bus communication protocol by which to communicate data and I/O commands between the server 22 and the data storage devices 26. As used herein, an "I/O command" refers to commands transmitted to data storage devices, such as the data storage devices depicted in FIG. 1. Examples of I/O commands include Small Computer System Interface Protocol (SCSI) commands, Serial ATA (SATA) commands, flash drive commands, and other I/O commands. The code for the bus communication protocol may be separate from or included within the operating system 34. In addition to storing operating systems and other applications, the system memory 32 is available for use as a cache to store temporarily data retrieved from read-ahead requests, as explained in more detail below.

A mass storage adapter 38 is connected to a data bus 39, and the mass storage adapter 38 receives the I/O commands from the server 22. In response, the mass storage adapter 38 causes the data storage devices 26 to act and respond accordingly, either by executing a read command in which data previously written or stored on the data storage devices 26 is read and supplied to the server 22 or the clients 24, or by executing a write command in which data is written to or stored on the data storage devices 26, or other mass storage I/O operations.

The groups of data storage devices 26 are connected by a separate bus 40 to the mass storage adapter 38. Each data storage device 26 includes a controller 42 that causes the data storage device 26 to perform in accordance with normal data storage functionalities and to perform I/O commands delivered to it by the mass storage adapter 38. It should be noted that a "data storage device," as used herein, includes a variety of storage mediums that can store data without power. Examples of data storage devices 26 include hard disk drives, non-volatile memories (e.g., flash memories), and tape drives. It should be noted that the data storage devices 26 depicted in FIG. 1 may be embodied in separate devices from the server 22 and the clients 24, or alternatively embodied within the server 22 or each of the clients 24.

The mass storage adapter 38, the groups of data storage devices 26, their controllers 42, and the interconnection bus 40 form a conventional redundant array of inexpensive or independent disks (RAID) mass storage system. The mass storage adapter 38 includes the independent functionalities to perform RAID mass storage functions in conjunction with the other components of the server 22. The organization and control of data storage devices 26 as a RAID group may, for example, guard against corruption and loss of data. The mass storage adapter 38 contains its own processor (not specifically shown) to respond to the I/O commands generated by the operating system 34 and to initiate its own data management functions to be executed by the data storage devices 26.

In general, embodiments of the present invention identify or track rates at which one or more applications, such as the applications executed on the clients 24, are requesting data from data storage devices 26. The operating system 34 also identifies or tracks the lengths of time in retrieving the data from the data storage devices 26. As explained in more detail below, the operating system 34 then initiates read-ahead requests based, in part, on the rates at which the applications are requesting data and the lengths in time in retrieving such data.

Figure 2:
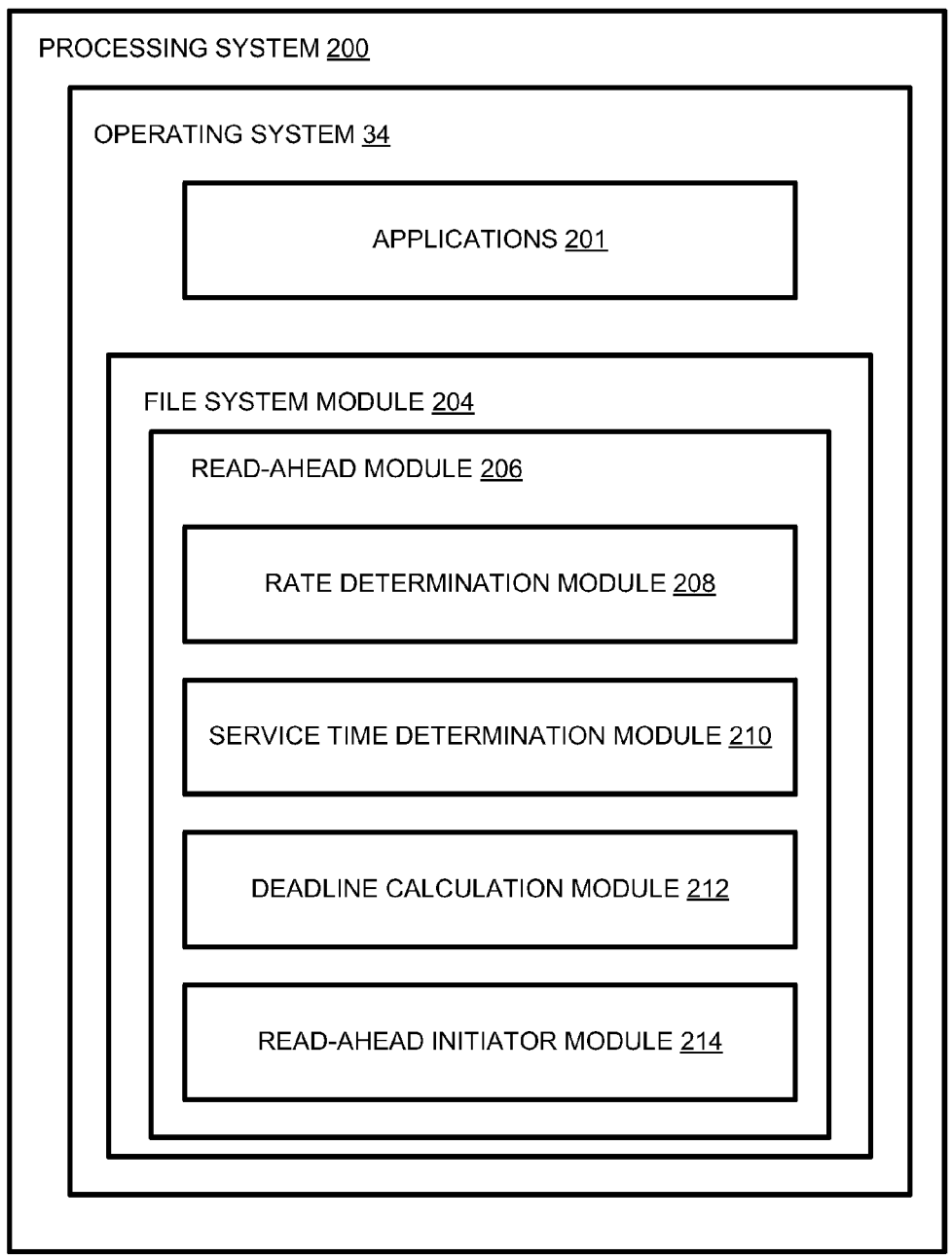
FIG. 2 depicts a block diagram of the various modules, in accordance with an embodiment of the present invention, that may be included in a processing system.

FIG. 2 depicts a block diagram of the various modules, in accordance with an embodiment of the present invention, that may be included in a processing system 200. It should be appreciated that the processing system 200 may be deployed in the form of, for example, a server computer, a client computer, a personal computer, a laptop computer, a mobile phone, a personal digital assistant, and other processing systems. For example, in one embodiment, the processing system 200 may be embodied as the server processing system 22 of the computer system 20 depicted in FIG. 1. In an alternate embodiment, the processing system 200 may be embodied as a client 24 of the same computer system 20. Referring to FIG. 2, in various embodiments, the processing system 200 may be used to implement computer programs, logic, applications, methods, processes, or software to initiate or time read-ahead requests, as described in more detail below.

In this example, the processing system 200 executes an operating system 34 that manages various software processes and/or services executing on the processing system 200. An example of an operating system 34 is Data ONTAP®, which is available from Network Appliance, Inc. of Sunnyvale, Calif., the assignee of embodiments of the present invention. The software processes and/or other services may include various applications 201 and a file system module 204. In general, the file system module 204 functions to access, store, and organize data. The access, storage, and organization of data may be block-based, filed-based, and/or other data object-based. For example, the file system module 204 may access, store, and organize data in blocks. In another example, the file system module 204 may access, store, and organize data as files.

As depicted in FIG. 2, this file system module 204 may include a read-ahead module 206 that initiates read-ahead requests. A "read-ahead request," as used herein, is an I/O operation to pre-fetch data in anticipation that the data will be needed or requested by an application in the near future. It should be appreciated that a variety of techniques may be used to determine which data is to be pre-fetched. For example, when an application requests blocks that are sequential (one after the other), those blocks of data can be pre-fetched in sequential order before the application requests these blocks of data. In another example, embodiments of the present invention may also apply to random requests or reads by the application, where specialized algorithms may be used to predict random reads. In an embodiment, the read-ahead module 206 may include a rate determination module 208, a service time determination module 210, a deadline calculation module 212, and a read-ahead initiator module 214.

The rate determination module 208 is adapted to track a rate of receipt of read requests from applications 201 or other applications executed at other processing systems. As explained in more detail below, the rate determination module 208 can, for example, track the rate by identifying the arrival times of the read requests from the applications 201. An "arrival time" of a read request, as used herein, is the time at which a module, such as the file system module 204 or the rate determination module 208, receives the read request. As previously noted, these read requests may be received from applications executed on the processing system 200 itself (e.g., applications 201) or on other processing systems (e.g., client processing systems in communication with the processing system 200). The data being requested by the read requests may be stored on one or more data storage devices included in the processing system 200 or located separately from the processing system 200, such as the data storage devices 26 depicted in FIG. 1.

In reference to FIG. 2, the service time determination module 210 is adapted to identify the time in servicing one or more read requests. The identification is made from a point where I/O commands are issued or sent, such as from the file system module 204. As an example, this time can be identified by measuring the actual time required by a data storage device to retrieve data. In particular, as explained in more detail below, the service time determination module 210 can identify this time by tracking when an I/O command is issued and when that I/O command is successfully completed. It should be noted that the time in servicing the read requests may also be referred to as a "service time," and accordingly, the terms may be used interchangeably.

The deadline calculation module 212 is adapted or configured to calculate a deadline by which to issue read-ahead requests. In general, this deadline refers to a time limit at which read-ahead requests are to be issued. As explained in more detail below, this deadline may be calculated based on, in part, the rate of receipt of read requests, as identified by the rate determination module 208, and the deadline, as identified by the service time determination module 210. The deadline calculation module 212 then communicates the calculated deadline to the read-ahead initiator module 214, which is adapted to issue read ahead requests based on the calculated deadline, as also described in more detail below.

It should be appreciated that in other embodiments, the processing system 200 may include fewer, more, or different modules apart from those shown in FIG. 2. For example, in an alternate embodiment, the rate determination module 208 and the service time determination module 210 may be combined into one module. In another embodiment, the read-ahead module 206 can be separate from and executed or processed in parallel with the file system module 204. In still yet another embodiment, the read-ahead initiator module 214 may include additional modules, such as modules adapted to identify an average size of the blocks of data being requested and sizes of existing blocks of data stored in cache, as explained in more detail below.

Figure 3:
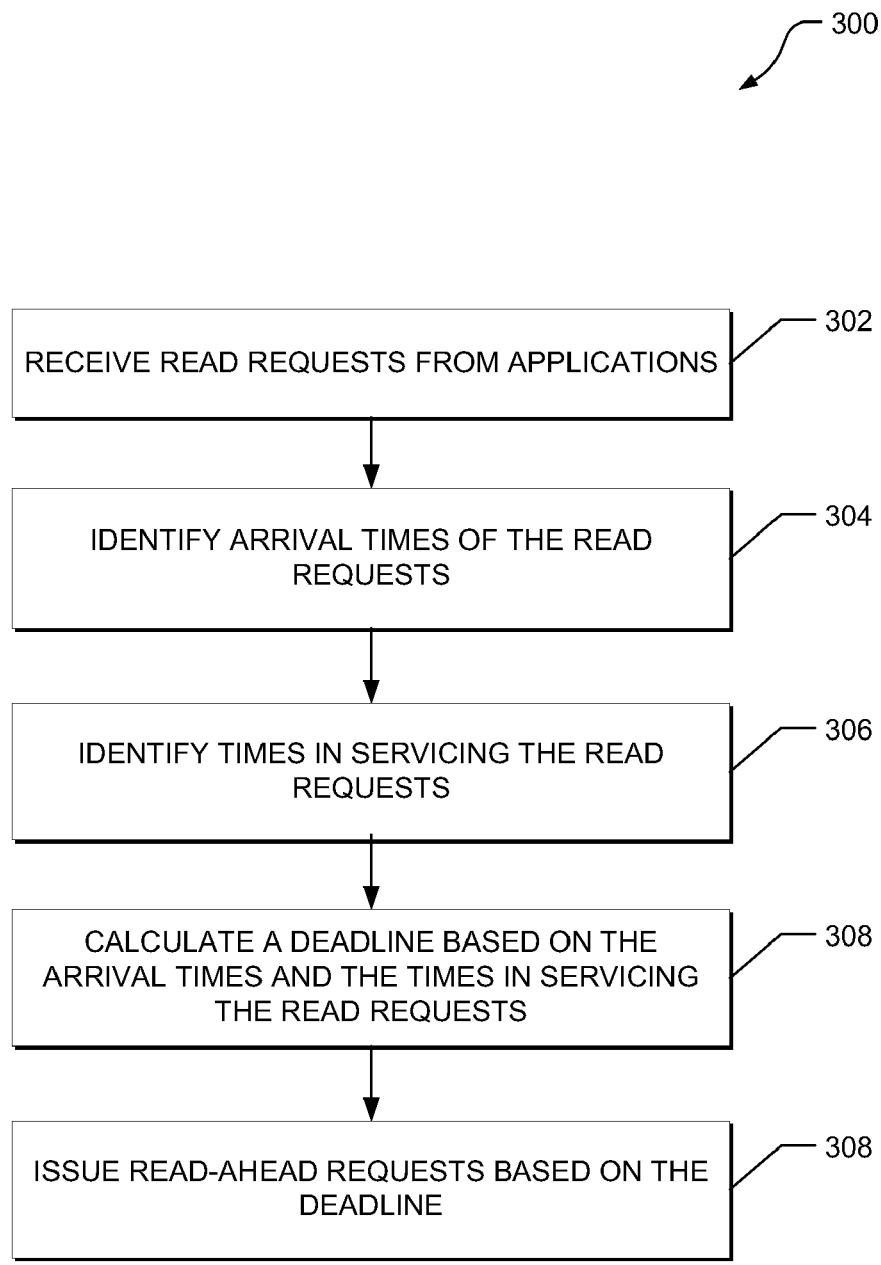
FIG. 3 depicts a flow diagram of a general overview of a method, in accordance with an example embodiment, for initiating read-ahead requests.

FIG. 3 depicts a flow diagram of a general overview of a method 300, in accordance with an example embodiment, for initiating read-ahead requests. In an embodiment, the method 300 may be implemented by the read-ahead module 206 and employed in the processing system 200 of FIG. 2. As depicted in FIG. 3, read requests from applications are received at 302 and the rate at which the read requests are received is identified. In one embodiment, to identify the rate of receipt, the arrival time of each read request is identified at 304. As explained in more detail below, the rate of receipt can be derived from the identified arrival times.

Upon receipt of the read requests, the time in servicing at least one of these read requests is also identified at 306. As previously noted, in one embodiment, the service time can also be identified by tracking when an I/O command is issued and when that I/O command is successfully completed. For example, a "first" time when an I/O command is issued to retrieve data requested by a read request is recorded. After the I/O command is issued, a "second" time when that I/O command is successfully completed is also recorded. An I/O command is successfully completed based on the receipt of the data requested or receipt of a signal indicating a successful completion of the I/O command. The service time can be calculated based on a difference between the "first" time and the "second" time.

As an example, a file system module transmits an I/O command to a hard disk to retrieve data requested by a read request from an application. The read-ahead module included in the file system module identifies a time when the I/O command is transmitted to the hard disk. The read-ahead module can identify this time from the system clock or other clocks. For example, the system clock may be provided by a real-time clock chip or a processor included in a processing system. Upon receipt of the I/O command, the hard disk reads data over sectors or blocks requested by the I/O command and returns the data back to the file system module. The read-ahead module identifies the time of receipt of the data from the hard disk, and then calculates the service time by subtracting the time when the I/O command was transmitted from the time of receipt of the data from the hard disk. As explained in more detail below, the service time may also be based on an average of multiple service times. In yet another embodiment, the service time may be not dynamically identified. Rather, the service time may be predefined by a user or administrator to reduce, for example, the amount of calculation to derive the deadline. Such a predefined service time may be set based on previous records of measured service times. A user or administrator may input a command to set the predefined service time. Alternatively, this predefined service time can be pre-programmed into a read-ahead module.

Thereafter, a deadline can be calculated at 308 based on the identified arrival times of the read requests and the identified service time. As explained in more detail below, the deadline may be based, in part, on a difference between one or more interarrival times, which are derived from arrival times, and the service time. Additionally, as explained in more detail below, the deadline may also be based on other variables, such as sizes of the blocks of data being requested and a size of existing blocks of data stored in cache from previous requests.

After the deadline is calculated, read-ahead requests are issued based on the calculated deadline at 308. That is, the timing of the issuance of read-ahead requests is based on the calculated deadline. For example, in one embodiment, the read-ahead requests may be issued at the deadline. In an alternate embodiment, the read ahead-requests may be issued before the deadline. Upon receipt of additional read requests, the deadline is continuously updated. As a result of issuing the read-ahead requests based on this continuously updated deadline, the issuance of the read-ahead requests effectively takes into account the rate at which the applications are requesting data. Thus, the issuance of the read-ahead requests are dynamically adjusted based on this rate. The dynamic adjustment may, for example, achieve levels of performance similar to a very aggressive read-ahead where a large amount of predicted data is stored in the cache, while requiring reduced memory or cache space.

Figure 4:
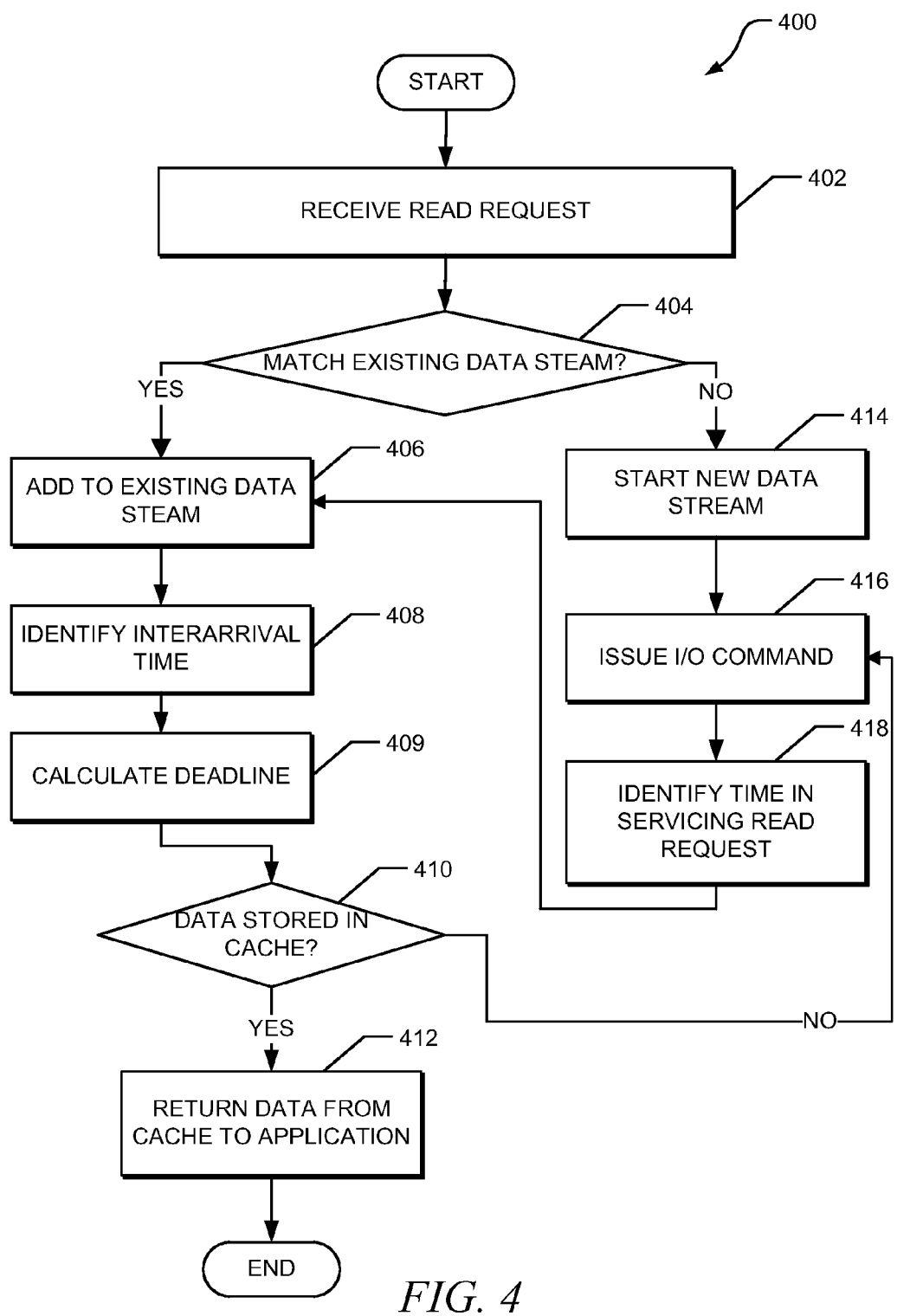
FIG. 4 depicts a flow diagram of a detailed method, in accordance with an alternate embodiment, for calculating a deadline to issue read-ahead requests.

FIG. 4 depicts a flow diagram of a detailed method 400, in accordance with an alternate embodiment, for calculating a deadline to issue to read-ahead requests. In an embodiment, the method 400 may be implemented by the file system module 204 (including read-ahead module 206) and employed in the processing system 200 of FIG. 2. As depicted in FIG. 4, a file system module receives a read request from an application at 402. In this example, the file system module then identifies at 404 whether the received read request is associated with an existing data stream. As used herein, a "data stream" refers to data or blocks of data that are read or stored in a sequence. That is, a data steam refers to a sequence of related data. Here, the identification of whether the received read request is associated with an existing data stream is used to determine which data is to be pre-fetched. As discussed above, in one example, when an application requests blocks that are sequential (e.g., blocks 1, 2, and 3), additional blocks in the series (e.g., blocks 4, 5, and 6) can be read into cache before being requested by the application.

If the read request is not associated with an existing data stream, then the file system module starts a new data stream at 414 and issues an I/O command at 416 to retrieve or read the data, as requested by the read request, from one or more data storage devices. At the same time, a service time determination module included in the read-ahead module identifies the time in serving the particular read request at 418. Given that read-ahead requests are associated with pre-fetching data before the data is actually requested, it should be noted that the service time identified in 418 is actually a projection or an estimate of a time in serving a next or future read request from the application. The projection of this service time can be based on one or more identified or previously recorded service times, which may be stored in a table or other data structures. For example, in one embodiment, as described above, the projection can be based on the service time of a single issuance of an I/O command. In an alternate embodiment, the projection can be based on a statistical analysis of multiple service times of multiple I/O commands. For example, a projection of a service time can be based on an average of multiple services times. Averages may include arithmetic means, geometric means, and harmonic means. These arithmetic, geometric, and harmonic means may be rolling, aged, or based on a total population. In other examples, the projection of the service time can be based on statistical linear regression, such as least squares, quantile regression, and least absolute deviation. In reference to FIG. 4, after starting the new data stream, the read request is added to the newly created data stream (or currently existing data stream) at 406, which is explained in more detail below.

Referring back to 404, if the read request is associated with an existing data stream, then this read request is added to the existing data stream at 406. In particular, the rate determination module included in the read-ahead module identifies the arrival time of this particular read request and stores it in a data structure, such as table 500 depicted in FIG. 5. Table 500 includes at least two columns, where column 502 stores the arrival times of read requests for a single or same data stream, namely data stream "A." In this column 502, the arrival times are stored as time stamps denoting the hour, minute, and second at which the file system module received each read request. These time stamps may be based on the system clock, as discussed above, or alternatively, the time stamps may be automatically generated and provided by a file system module.

Figure 5:
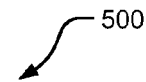
FIG. 5 depicts a table for storing arrival times and interarrival times associated with a same data stream.

Returning to FIG. 4, an interarrival time is then identified at 408. An "interarrival time," as used herein, refers to a time between two arrival times. That is, interarrival time is the difference between two arrival times, which can be defined as:

Interarrival=ArrivalTime$A$−ArrivalTime$B$ wherein ArrivalTimeA and ArrivalTimeB are different arrival times associated with two read requests associated with a same data stream. As an example, an interarrival time can be identified by subtracting an earlier arrival time of a previous read request from the arrival time of the read request received at 402. As depicted in FIG. 5, the interarrival time can be stored in a data structure, such as the table 500 depicted in FIG. 5. Table 5 additionally includes a second column 503 that stores the identified interarrival times, which are based on a difference between the arrival times stored in column 502. For example, the difference between arrival times 12:40:05 and 12:40:01 is 04 seconds, which is stored in column 503.

Given that read-ahead requests are associated with pre-fetching data before the data is actually requested, it should be additionally noted that the interarrival time identified in 408 of FIG. 4 is actually a projection or estimate of an interarrival time of a next or future read request from the application. Similar to the service time, the projection of this interarrival time can be based on one or more identified or previously recorded arrival times, which, for example, are stored in column 502 of the table 500. The projection can be based on a statistical analysis of multiple interarrival times, which, for example, are stored in column 503 of the table 500. For example, a projection of an interarrival time can be based on an average of multiple interarrival times. Averages may include arithmetic means, geometric means, and harmonic means. These arithmetic, geometric, and harmonic means may be rolling, aged, or based on a total population. In other examples, the projection of the interarrival time can be based on statistical linear regression, such as least squares, quantile regression, and least absolute deviation.

In reference to FIG. 4, with the interarrival time and service time identified, the deadline may be calculated at 409. As discussed above, the deadline is generally based on the difference between the interarrival time and the service time. In a particular embodiment, the deadline may be defined as:

$$Deadline = Now + \left(\frac{Blockmem}{Readrequestsize}\right) * Interarrival - Servicetime \quad (1.0)$$

where Now is the current time, Blockmem is a size of existing blocks of data stored in cache from previous read-ahead requests, Interarrival is the projected interarrival time for a next read request, and Servicetime is the projected service time for the next read request. Regarding Readrequestsize, this variable is a projected or an estimated size of a block of data being requested by a future or next read request. The projection of this size can be based on one or more previously identified sizes of blocks of data being requested by previous read requests. The projection can be based on a statistical analysis of multiple previously identified sizes of blocks of data. For example, a projection of a size of block of data can be based on an average of multiple sizes of blocks of data. Averages may include arithmetic means, geometric means, and harmonic means. These arithmetic, geometric, and harmonic means may be rolling, aged, or based on a total population. In other examples, the projection of the size of block of data time can be based on statistical linear regression, such as least squares, quantile regression, and least absolute deviation.

As an example, read requests may be arriving from an application at every 100 milliseconds, and an average time in servicing these read requests is 10 milliseconds. At a current time, the size of existing blocks of data stored in cache is 512K. Additionally, the average size of blocks of data previously requested is 256K. With the application of Equation 1.0, the deadline is calculated to be 190 milliseconds into the future at which a read-ahead initiator module will need to issue an I/O command to pre-fetch data.

It should be appreciated that if the file system module has received a single read request, then the time in servicing this single read request can be identified at 418, but the interarrival cannot be identified at this point, because the interarrival time is based on receipt of multiple read requests or multiple arrival times. Accordingly, the deadline is not computed at this point and the read-ahead initiator module can default to a deadline of "now," which causes a read-ahead request to be issued immediately.

It should be appreciated that since there are large variations in service times and arrival times, the computation of an exact deadline may result in a deadline that is too late. To adjust the deadline, one or more heuristics may be applied to any suitable variables used to calculate the deadline, in accordance with various embodiments. For example, the deadline computation can use an interarrival time that is lower than the computed average (e.g., one-half the computed average interarrival time). In another example, the service time used to compute the deadline can be longer than the computed average (e.g., two or three times the computed average service time). In yet another example, the deadline itself can be moved forward by some arbitrary amount (e.g., 100 milliseconds).

Still referring to FIG. 4, with the deadline calculated at 409, the file system module checks whether the requested data is stored in the cache at 410. If the data is stored in the cache, then the data is returned from the cache to the application at 412. On the other hand, if the data is not stored in the cache, then the file system module immediately issues an I/O command to retrieve the requested data at 416 and, as depicted in FIG. 4, repeats the operations for identifying the service time and continuously updates the interarrival time of the read requests.

Figure 6:
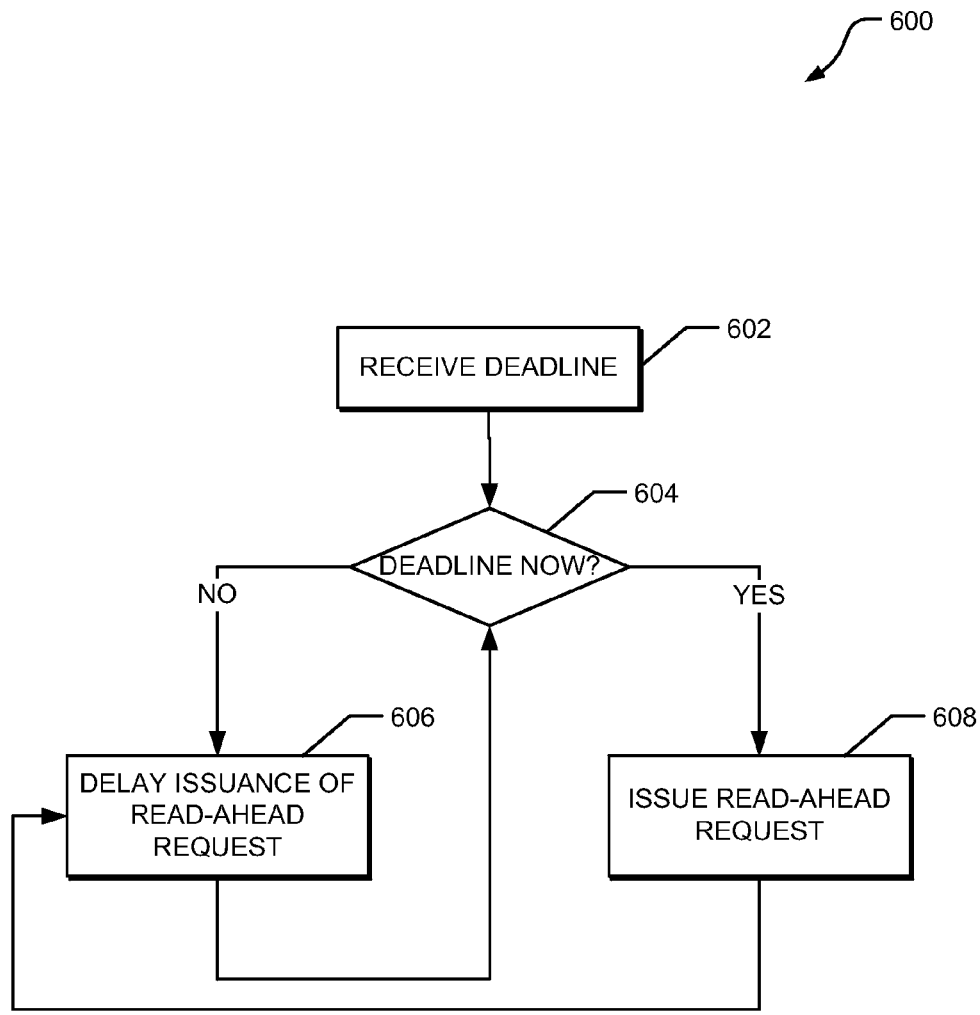
FIG. 6 depicts a flow diagram of a detailed method, in accordance with an example embodiment, for issuing read-ahead request based on the calculated deadline.

FIG. 6 depicts a flow diagram of a detailed method 600, in accordance with an example embodiment, for issuing read-ahead request based on a calculated deadline. In an embodiment, the method 600 may be implemented by the read-ahead initiator module 214 and employed in the processing system 200 of FIG. 2. In general, after a deadline is computed, read-ahead requests are stored in a data structure and are issued in deadline order. For example, as depicted in FIG. 6, the read-ahead initiator module receives the calculated deadline at 602 and checks at 604 whether the deadline is "now," which is the current time. If the deadline is now, then the read-ahead initiator module immediately issues a read-ahead request at 608. The read-ahead initiator module may, in one example, identify that the deadline is "now" by comparing the received calculated deadline with a current time provided by, for example, a system clock. If there is no difference or the difference is negligible (e.g., difference within about ±1 millisecond) between the calculated deadline and the current time provided by the system clock, then the deadline is now.

On the other hand, if the deadline is not now, then the read-ahead initiator module delays issuance of the read-ahead request at 606 for a period of time defined by the calculated deadline. For example, if the deadline is 100 milliseconds from the current time (or "now"), then the read-ahead initiator module delays issuance of a next read-ahead request before or at 100 milliseconds into the future. The read-ahead initiator module continuously receives updated deadlines at 602 and accordingly, continuously adjusts the issuance of read-ahead requests.

It should be appreciated that when the deadline is "now," there may be another optimization possible in certain embodiments. In particular, if an application has requested a block that is not in cache, an I/O command is issued to retrieve that block of data. However, if that block also triggers a read-ahead request with a deadline of "now," and those two requests are for consecutive blocks, then the I/O commands may be combined into a single read or single I/O command, which may reduce I/O operations and may decrease latency. This technique may also be applied if the deadline is close to "now" (e.g., within a storage service time magnitude of order).

Additionally, it should be noted that read-ahead requests that are issued and completed before being requested by an application can be stored in the cache. Therefore, it is not necessary to time the read-ahead requests precisely. However, given that cache sizes are limited, issuing read-ahead requests too far in advance may result in them being evicted from the cache before they are read. Embodiments of the present invention rely on a window of opportunity within which the read-ahead requests are issued in order to retrieve data before an application reads the data, but before a cache eviction takes place. Accordingly, the data structure that stores the read-ahead requests can be approximately sorted, and that the read-ahead requests may be issued in approximately deadline order. Thus, for example, an O(1) bucket-based sorting algorithm, such as a rotating priority queue (RPQ), can be used for sorting the data structure.

Figure 7:
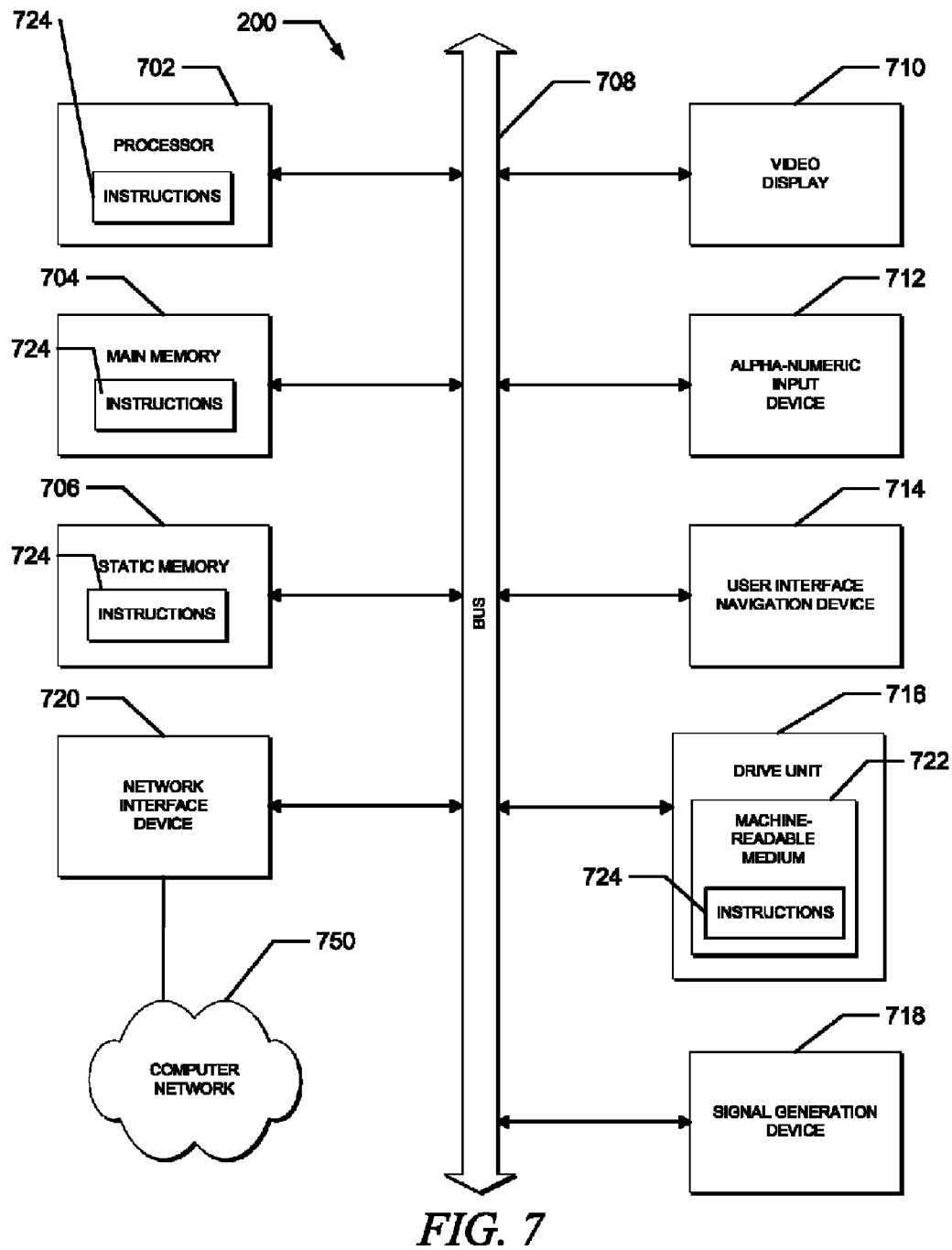
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a processing system 200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 200 includes a processor 702 (e.g., a central processing unit (CPU), a graphics processing unit (GPU) or both), a main memory 704 (e.g., random access memory (a type of volatile memory)), and static memory 706 (e.g., static random-access memory (a type of volatile memory)), which communicate with each other via bus 708. The processing system 200 may further include video display unit 710 (e.g., a plasma display, a liquid crystal display (LCD) or a cathode ray tube (CRT)). The processing system 200 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by processing system 200, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner In example embodiments, one or more computer systems (e.g., the processing system 200) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processor or processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for initiating read-ahead requests may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of initiating a read-ahead request, the method comprising:
    before receiving a future read request sent by an application:
        projecting an interarrival time for the future read request based on identifying arrival times of read requests previously received from the application,
        projecting a time in servicing the future read request based on identifying a time in servicing at least one of the read requests previously received from the application,
        calculating a deadline for the future read request based on the projected interarrival time for the future read request and the projected time in servicing the future read request, and
        issuing the read-ahead request based on the deadline, the read-ahead request to read additional data from the data storage device.

2. The method of claim 1, wherein the identification of the arrival times comprises:
    identifying a first arrival time of a first read request from the read requests previously received from the application;
    identifying a second arrival time of a second read request from the read requests previously received from the application; and
    subtracting the first arrival time from the second arrival time to define an interarrival time,
    wherein the calculation of the deadline is based on a difference between the interarrival time and the time in servicing the read requests.

3. The method of claim 1, wherein the identification of the time in servicing the at least one of the read requests comprises:
    identifying a first time when an input/output (I/O) command is issued, the I/O command being issued based on receipt of the at least one of the read requests previously received from the application;

identifying a second time of receipt of the signal, the signal indicating a successful completion of the I/O command after the issuance of the I/O command; and subtracting the first time from the second time to define the time in servicing the at least one of the read requests.

4. The method of claim 3, wherein the time in servicing the at least one of the read requests previously received from the application is predefined.

5. The method of claim 1, further comprising repeating each of the method operations for a next set of read requests, wherein issuing the read-ahead request based on the deadline comprises:

receiving an updated deadline;

delaying issuance of a next read-ahead request for a period defined by the updated deadline; and issuing the next read-ahead request at the updated deadline.

6. The method of claim 1, wherein the read requests previously received from the application are associated with a same data stream.

7. A machine-readable medium that stores instructions, which, when performed by a machine, cause the machine to perform operations comprising:

identifying sizes of blocks of data that were requested by read requests previously received from an application;

identifying interarrival times of the read requests previously received from the application;

identifying times in servicing the read requests previously received from the application;

identifying a size of existing blocks of data stored in cache from previous read-ahead requests; and before receiving a future read request from an application:

projecting a size of a block of data that will be requested by the future read request based on the sizes of the blocks that were requested by the read requests previously received from the application, projecting an interarrival time for the future read request based on the interarrival times of the read requests previously received from the application, projecting a time in servicing the future read request based on the times in servicing the read requests previously received from the application, calculating a deadline based on the projected size of the block, the projected interarrival time, the projected time in servicing the future read request, and the size of the existing blocks, and issuing a read-ahead request to the data storage device before the deadline, the read-ahead request to read additional blocks of data from the data storage device.

8. The machine-readable medium of claim 7, wherein the projection of the size of the block of data is based on an average of the sizes of the blocks that were requested by the read requests previously received from the application, wherein the projection of the interarrival time is based on an average of the interarrival times of the read requests previously received from the application, and wherein the projection of the time in servicing the future read request is based on an average of the times in servicing the read requests previously received from the application.

9. The machine-readable medium of claim 7, wherein the projection of the size of the block of data is based on a statistical linear regression of the sizes of the blocks that were requested by the read requests previously received from the application, wherein the projection of the interarrival time is based on a statistical linear regression of the interarrival times of the read requests previously received from the application, and wherein the projection of the time in servicing the future read request is based on a statistical linear regression of the times in servicing the read requests previously received from the application.

10. The machine-readable medium of claim 7, wherein the calculation of the deadline comprises:

identifying a current time;

calculating a difference between the current time and the projected time in servicing the future read request;

calculating a ratio of the size of the existing blocks to the projected size of the block of data will be requested by the future read request; and adding the difference to the ratio multiplied by the projected interarrival time to define the deadline.

11. The machine-readable medium of claim 7, further comprising identifying the read requests previously received from the application being associated with a same data stream.

12. A processing system in communication with a client processing system, the processing system comprising:

at least one processor;

a rate determination module, implemented by the at least one processor, adapted to project, before receiving a future read request from an application, an interarrival time for the future read request based on identifying arrival times of previously received read requests from the client processing system;

a service time determination module, implemented by the at least one processor, adapted to project, before receiving the future read request from an application, a time in servicing the future read request based on identifying a time in servicing at least one of the previously received read requests from the data storage device;

a deadline calculation module, implemented by the at least one processor, adapted to calculate, before receiving the future read request from an application, a deadline based on the projected interarrival time for the future read request and the projected time in servicing the future read request; and a read-ahead initiator module, implemented by the at least one processor, adapted to issue, before receiving a future read request from an application, the read-ahead request based on the deadline, the read-ahead request to read additional data from the data storage device.

13. The processing system of claim 12, wherein the rate determination module is further adapted to calculate interarrival times based on the arrival times of the previously received read requests, and adapted to project an interarrival time for the future read request based on the interarrival times, wherein the service time determination module is further adapted to project a further time in servicing the future read request based on the time in servicing the at least one of the previously received read requests, and wherein the deadline calculation module is adapted to calculate the deadline based on the projected interarrival time and the projected further time in servicing the future read request.

14. The processing system of claim 12, wherein the identification of the arrival times comprises:

identifying a first arrival time of a first read request from the previously received read requests;

identifying a second arrival time of a second read request from the previously received read requests; and subtracting the first arrival time from the second arrival time to define an interarrival time, wherein the deadline calculation module is adapted to calculate the deadline based on a difference between the interarrival time and the time in servicing the at least one of the previously received read requests.

15. The processing system of claim 12, wherein the identification of the time in servicing the at least one of the read requests comprises:

identifying a first time when an input/output (I/O) command is issued, the I/O command being issued based on receipt of the at least one of the previously received read requests;

identifying a second time of receipt of the signal, the signal indicating a successful completion of the I/O command after the issuance of the I/O command; and subtracting the first time from the second time to define the time in servicing the at least one of the previously received read requests.

16. The processing system of claim 12, wherein the read-ahead initiator module is adapted to issue the read-ahead request before the deadline.

17. A processing system, comprising:

at least one processor; and a machine-readable medium in communication with the at least one processor, the machine-readable medium storing a rate determination module, a service time determination module, a deadline calculation module, and a read-ahead initiator module, that are executable by the at least one processor, the rate determination module being executed by the at least one processor to cause operations to be performed, comprising projecting, before a future read request is received, an interarrival time for the future read request based on identifying arrival times of read requests previously received from an application, the service time determination module being executed by the at least one processor to cause operations to be performed, comprising projecting, before the future read request is received, a time in servicing the future read request based on identifying a time in servicing at least one of the read requests previously received from the application, the deadline calculation module being executed by the at least one processor to cause operations to be performed, comprising calculating, before the future read request is received, a deadline based on the projected interarrival time for the future read request and the projected time in servicing the future read request, and the read-ahead initiator module being executed by the at least one processor to cause operations to be performed, comprising issuing the read-ahead request based on the deadline, the read-ahead request to read additional data from a data storage device before receiving the future read request.

18. The processing system of claim 17, wherein the processing system further comprises the data storage device, and wherein the application is executed on the processing system.

19. The processing system of claim 17, wherein the application is executed on a client processing system that is in communication with the processing system.

\* \* \* \* \*